United States Patent
Woodfin, IV

(10) Patent No.: US 7,778,881 B2
(45) Date of Patent: Aug. 17, 2010

(54) METHOD, MEDIUM, AND APPARATUS OF AGREEING TO PROVIDE A PRODUCT PRIOR TO SELECTING A VENDOR TO PROVIDE THE PRODUCT

(76) Inventor: Joseph G. Woodfin, IV, 12910 Genito Rd., Midlothian, VA (US) 23112

( * ) Notice: Subject to any disclaimer, the term of this patent is extended or adjusted under 35 U.S.C. 154(b) by 243 days.

(21) Appl. No.: 11/346,610

(22) Filed: Feb. 2, 2006

(65) Prior Publication Data
US 2007/0179861 A1 Aug. 2, 2007

(51) Int. Cl.
*G06Q 30/00* (2006.01)
*G06F 17/30* (2006.01)

(52) U.S. Cl. .......................... 705/26; 705/27
(58) Field of Classification Search ................. 705/26, 705/27
See application file for complete search history.

(56) References Cited

U.S. PATENT DOCUMENTS

| | | | |
|---|---|---|---|
| 5,950,169 A * | 9/1999 | Borghesi et al. ............... 705/4 |
| 7,136,821 B1 * | 11/2006 | Kohavi et al. .................. 705/5 |
| 2001/0044751 A1 * | 11/2001 | Pugliese et al. ............... 705/26 |
| 2002/0032613 A1 * | 3/2002 | Buettgenbach et al. ........ 705/26 |
| 2003/0115114 A1 * | 6/2003 | Tateishi et al. ................. 705/26 |
| 2003/0120508 A1 * | 6/2003 | Kizor et al. .................... 705/1 |
| 2003/0195778 A1 * | 10/2003 | Smith ............................. 705/7 |
| 2003/0212602 A1 * | 11/2003 | Schaller ......................... 705/22 |
| 2005/0144095 A1 * | 6/2005 | Scruton et al. ................ 705/30 |
| 2005/0289039 A1 * | 12/2005 | Greak ........................... 705/37 |
| 2007/0130044 A1 * | 6/2007 | Rowan .......................... 705/37 |
| 2007/0136162 A1 * | 6/2007 | Thibodeau et al. ............ 705/35 |
| 2007/0208625 A1 * | 9/2007 | Walker et al. ................. 705/17 |

OTHER PUBLICATIONS

EverDrive, 2004 http://web.archive.org/web/20041009125646/www.everdrive.com/Article.asp.*

* cited by examiner

*Primary Examiner*—Yogesh C Gang
*Assistant Examiner*—Matthew Zimmerman
(74) *Attorney, Agent, or Firm*—Buckley, Maschoff & Talwalkar LLC

(57) ABSTRACT

According to some embodiments, a transaction entity may determine historical pricing information associated with a plurality of vendors and a plurality of products. The transaction entity may also receive, from a remote customer, purchasing information associated with a requested product. A first price may be automatically calculated based at least in part on the purchasing information and the historical pricing information. Moreover, the transaction entity may agree to provide a selected product to the customer in exchange for payment of an amount based on the first price. It may also be automatically arranged for a remote selling vender to ship a sold product to the customer in exchange for payment of a second price from the transaction entity to the vendor.

15 Claims, 12 Drawing Sheets

METHOD, MEDIUM, AND APPARATUS OF AGREEING TO PROVIDE A PRODUCT PRIOR TO SELECTING A VENDOR TO PROVIDE THE PRODUCT

FIELD

The present invention relates to transactions. In particular, the present invention relates to exchanges between remote customers and vendors.

BACKGROUND

A customer may purchase a product from a retailer. For example, a customer may purchase an automotive part from an automotive store. In some cases, however, so many different products might be available that it is not possible for the retailer to have all of the products currently in stock. This might be the case, for example, with used automotive parts. That is, there are so many different products that might be needed by a customer (e.g., associated with different automobile makes, models, and/or years) it is not practical for a retailer (or junkyard) to have all—or even most—of them in stock.

A customer might visit a retailer and order a used automotive part (e.g. an engine for a particular 2001 Ford truck). The retailer or some other entity could then manually place telephone calls to various junkyards until the appropriate part is located. In this situation, however, the customer might not know the price of the part when he or she places the order. Moreover, the process can be time consuming, and different parts and part numbers may need to be cross-referenced and/or translated (e.g., because a transmission for a 1999 Grand Am might be usable in connection with other models and/or years). In addition, even when the part is located, there may be no way to determine if the price is appropriate (e.g., the product might be available from a different junkyard for a much lower price).

SUMMARY

To alleviate problems inherent in the prior art, the present invention introduces systems and methods to facilitate exchanges between remote customers and vendors.

In one embodiment of the present invention, historical pricing information associated with a plurality of vendors and a plurality of products may be determined. In addition, purchasing information associated with a requested product may be received from a remote customer. A first price may be automatically calculated based at least in part on the purchasing information and the historical pricing information. Moreover, a transaction entity may agree to provide a selected product to the customer in exchange for payment of an amount based on the first price. The transaction entity may also automatically arrange for a remote selling vender to ship a sold product to the customer in exchange for payment of a second price from the transaction entity to the vendor.

Another embodiment comprises: means for determining, by a transaction entity, historical pricing information associated with a plurality of vendors and a plurality of products; means for receiving, from a remote customer, purchasing information associated with a requested product; means for automatically calculating a first price based at least in part on the purchasing information and the historical pricing information; means for agreeing to provide a selected product to the customer in exchange for payment of an amount based on the first price; and means for automatically arranging for a remote selling vender to ship a sold product to the customer in exchange for payment of a second price from the transaction entity to the vendor.

With these and other advantages and features of the invention that will become hereinafter apparent, the invention may be more clearly understood by reference to the following detailed description of the invention, the appended claims, and the drawings attached herein.

DETAILED DESCRIPTION

Figure 1:
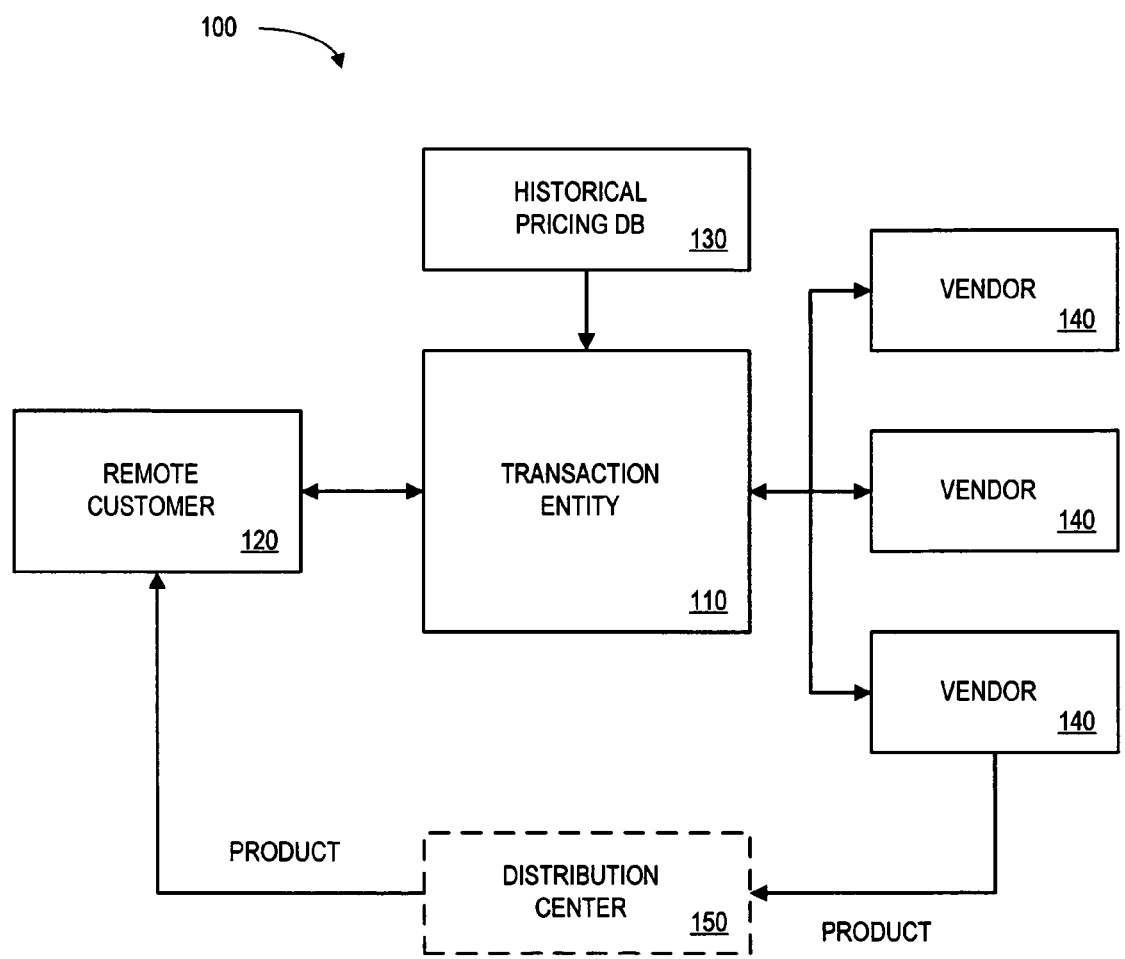
FIG. 1 illustrates a transaction environment according to some embodiments of the present invention.

FIG. 1 illustrates a transaction environment 100 according to some embodiments of the present invention. The environment 100 may include a transaction entity 110 to facilitate transactions that involve a remote customer 120 and a vendor 140. Although a single remote customer 120 is illustrated in FIG. 1, note that a transaction entity 110 might communicate with a large number of remote customers. According to some embodiments, the transaction entity 110 communicates with remote customers 120 and/or vendors 140 via a network, such as a Local Area Network (LAN), a Metropolitan Area Network (MAN), a Wide Area Network (WAN), a proprietary network, a wireless network, or an Internet Protocol (IP) network such as the Internet, an intranet or an extranet.

The transaction entity 110 may access a historical pricing database 130. The historical pricing database 130 might store information about products and/or vendors 140, such as prices at which various vendors 140 have sold various products. The information in the historical pricing database 130 might be provided by vendors 140 and/or be associated with previous sales that have been facilitated by the transaction entity 110. The historical pricing database 130 might also store availability information, average shipping prices and/or return rates for certain types of parts.

According to some embodiments, the transaction entity 110 may receive from a remote customer 120 purchasing information associated with a requested product. For example, the remote customer 120 might transmit a requested product identifier to the transaction entity 110 via a Web site or kiosk located at a retail store.

Based on the purchasing information received from the remote customer 120 and information accessed from the historical pricing database 130, the transaction entity 110 may automatically calculate a first price for the product. For example, the transaction entity 110 might determine an average price associated with a product (e.g., based on past sales of similar products from various vendors 140) and add a small surcharge (e.g., a percentage or dollar amount) to calculate the first price. As used herein, the term "automatically" may refer to, for example, a process or action that is performed by a processor (e.g., without the aide of a person).

The transaction entity 110 may then agree to provide a selected product to the customer 120 in exchange for payment of an amount based on the first price. For example, the transaction entity 110 might display the first price to the customer 120 and the customer 120 may agree to purchase the product at that price (e.g., by providing a credit card number to the transaction entity 110). Note that at this point, the remote customer 120 may provide payment to the transaction entity 110 and that the transaction entity 110 might not posses (or even have identified) the source an actual product. According to some embodiments, the customer 120 might provide payment to a retailer, which in turn may provide payment to the transaction entity.

The transaction entity 110 may then automatically arrange for a remote selling vender 140 to ship a sold product to the customer 120 in exchange for payment of a second price from the transaction entity 110 to the vendor 140. For example, the transaction entity 110 might identify a vendor 140 that has possession of a suitable product, provide payment of the second price (different from the first price) to the vendor 140, and instruct the vendor 140 to ship the sold product directly to the remote customer 120. According to some embodiments, the vendor 140 might instead ship the product to a retail store proximate to the remote customer 120 (e.g., when he or she ordered the product via a kiosk located at the retailer). Moreover, according to some embodiments the vendor 140 might instead ship the product to the remote customer 120 via a distribution center 150 (e.g., where the product might be inspected and/or re-packaged by a party associated with the transaction entity 110).

Figure 2:
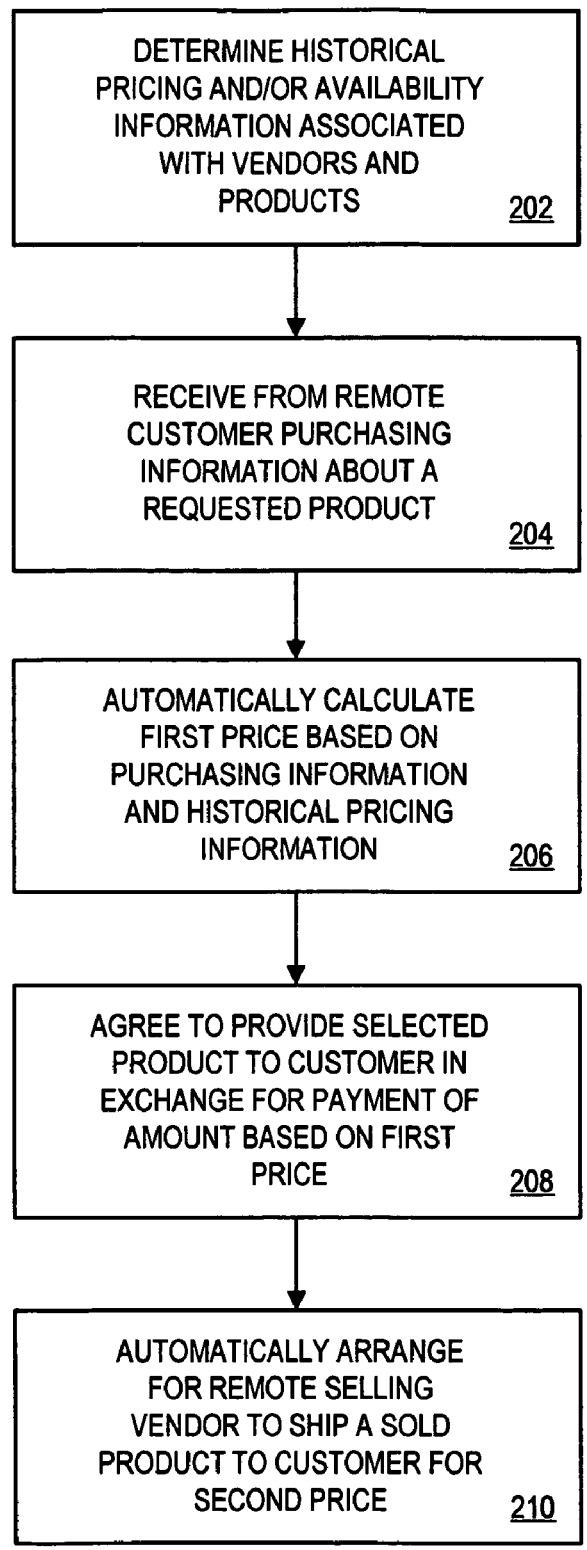
FIG. 2 is a flow chart of a method to facilitate a transaction according to some embodiments of the present invention.

FIG. 2 is a flow chart of a method to facilitate a transaction according to some embodiments of the present invention. The flow charts described herein do not imply a fixed order to the steps, and embodiments of the present invention may be practiced in any order that is practicable. Moreover, some or all of the steps may be performed by a processor executing a software program.

At 202, historical pricing information associated with a plurality of vendors and a plurality of products may be determined. By way of example, a transaction entity might store pricing information about various used automotive parts (e.g., engines, transmissions, and tail light assemblies) that have been previously sold or offered for sale by junkyards and other re-sellers.

Figure 3:
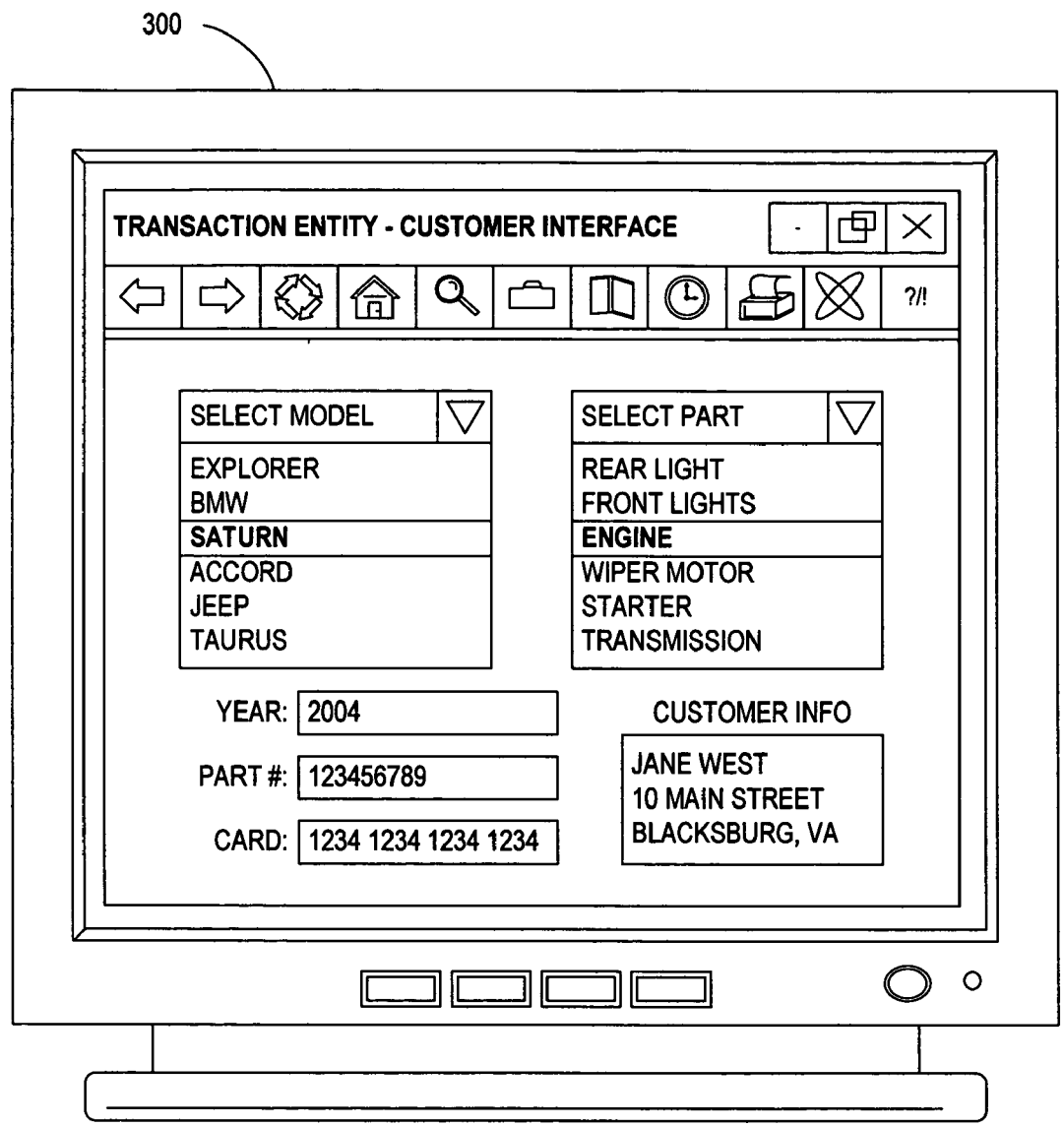
FIG. 3 illustrates a customer interface according to some embodiments of the present invention.

At 204, purchasing information associated with a requested product may be received from a customer. For example, a customer interested in purchasing a used automobile engine might go to a kiosk located at a retail store (e.g., an automotive retail store) near his or her home. The customer might then provide an indication of the particular type of engine he or she is interested using a Graphical User Interface (GUI), such as the display 300 illustrated in FIG. 3, by selecting an automobile model, year, and/or other information.

According to some embodiments, the customer may provide a product number via the display 300. Note that the display 300, as well as the other displays described herein, are provided only as example and other information and/or displays may be provided. The kiosk might then transmit the product information to the transaction entity (e.g., to a server operator by the transaction entity).

Referring again to FIG. 2, at 206 a first price may be automatically calculated based at least in part on the purchasing information and the historical pricing information. For example, the transaction entity might determine the last fifty engines (of the appropriate make and model) that have been sold. According to some embodiments, the transaction entity might ignore the five highest and five lowest prices and average the remaining sales to determine a first price. According to other embodiments, a mean, medium, or mode price might be selected.

Note that information other than pricing information may also be determined by the transaction entity. For example, the location of the customer, a return history, the quality of various vendors, and/or warranty provided by the vendor information might be considered when calculating the first price.

At 208, the transaction entity may agree to provide a selected product to the customer in exchange for payment of an amount based on the first price. For example, the transaction entity might transmit an offer to kiosk indicating that an appropriate used engine can be provided to the customer for $1,500. The customer might then accept the offer and provide payment to the transaction entity or retailer (e.g., via his or her credit card account).

At 210, it is automatically arranged for a remote selling vender to ship a sold product to the customer in exchange for payment of a second price from the transaction entity to the vendor. For example, the transaction entity might select a vendor who is willing to sell an appropriate engine for $1,300. In this case, the transaction entity could provide payment to the selling vendor, which in turn would ship the engine to the customer (or to the retail store who could then provide the engine to the customer). According to some embodiments, a vendor may provide a price quote to the transaction entity.

According to some embodiments, the transaction entity might select the selling vendor based on inventory information stored at the transaction entity. According to another embodiment, the transaction entity may transmit a request to a number of potential vendors (e.g., including an engine identifier and an offered price).

Figure 4:
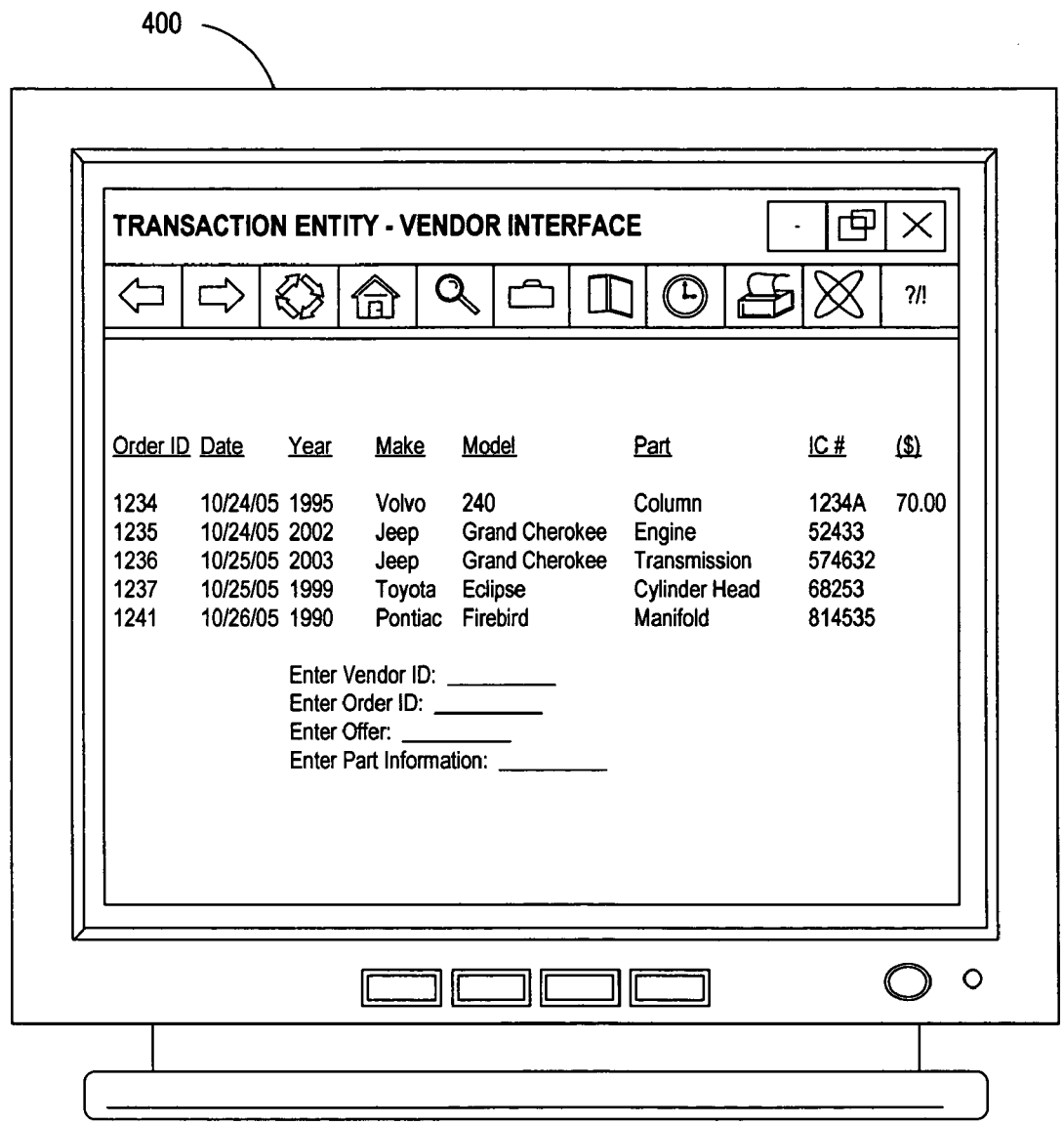
FIG. 4 illustrates a vendor interface according to some embodiments of the present invention.

According to still other embodiments, the transaction entity might post information about various needed products (for various customers). Junkyards could then access the posts (e.g., via a secure Web site). One example of such a system is illustrated by the display 400 of FIG. 4, which includes posts associated with a 1995 Volvo column, a 2002 Jeep Engine, etc. In this case, a vendor could view the posts and decide whether or not to sell a product. Note that the posts may be presented as an auction (e.g., and multiple vendors could "bid" to sell appropriate products at various prices).

The posts might be displayed to all vendors who have access to the Web site, or, according to some embodiments, a subset of potential vendors might be allowed to view various posts. That is, one vendor might view the display 400 of FIG. 4, while another vendor might view another display (including some, but not all of the posts illustrated in FIG. 4 as well as other posts).

Figure 5:
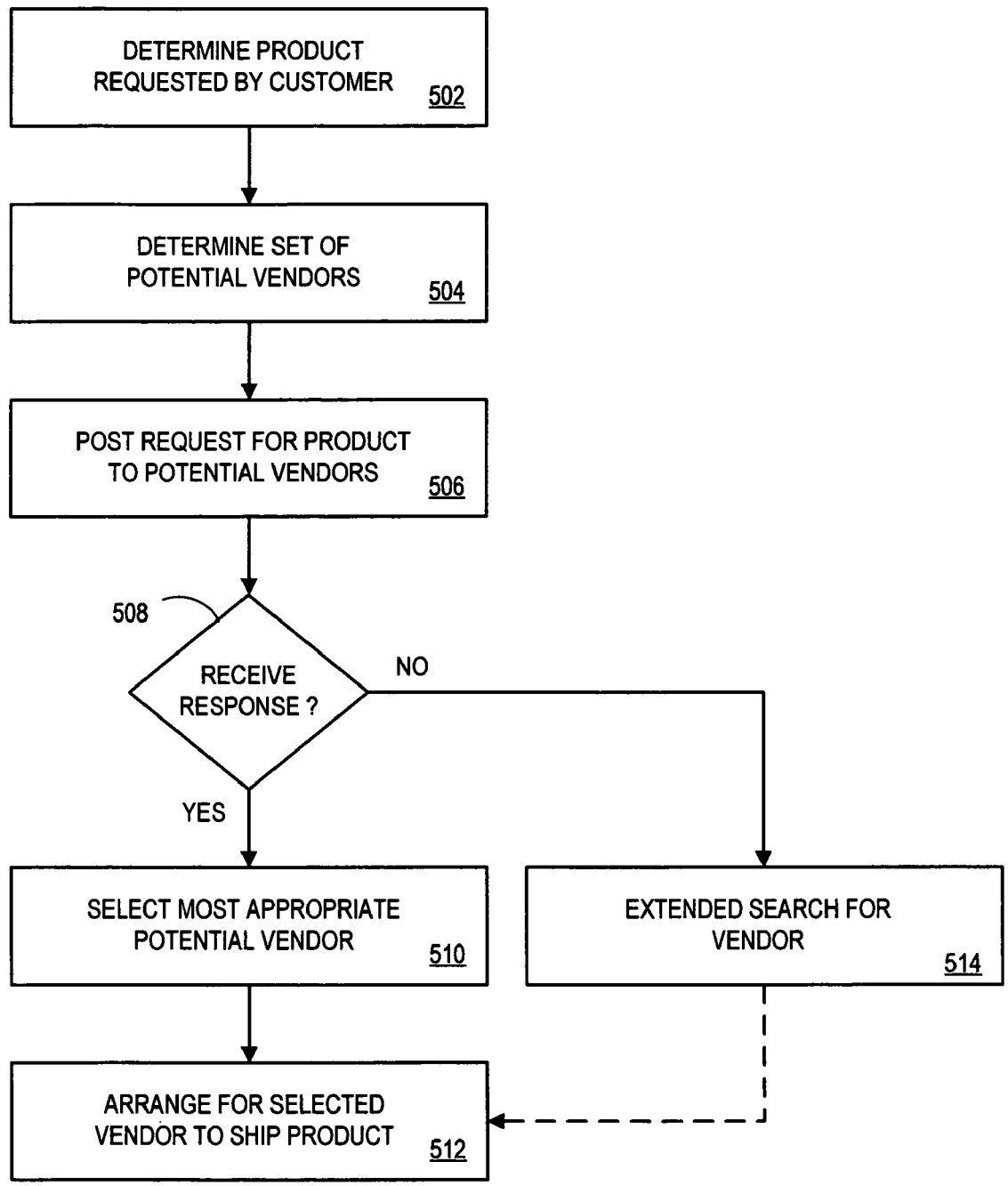
FIG. 5 is a flow chart of a method to select a vendor according to some embodiments of the present invention.

FIG. 5 is a flow chart of a method to select a vendor according to some embodiments of the present invention. At 502, a product requested by a customer is determined. For example, the transaction entity might determine the product based on automobile information received from a customer (e.g., a make and model number), a part number that is received from a customer, and/or an industry translation table associated with various parts and/or numbers (e.g., a 2003 engine might be suitable for automobiles manufactured from 2002 through 2006).

At 504, a set of potential vendors is determined. According to some embodiments, the set may comprise all of the vendors associated with a transaction entity. According to other embodiments, a vendor selection engine (e.g., an application or server) may be determine the set. The vendor selection engine might, for example, select potential vendors based on historical pricing information, location, and/or a vendor grade. The vendor grade could be associated with historical pricing information, historical performance information, and/or a warranty provided by a vendor information.

A request for the requested product may them be posted to the potential vendors at 506. For example, the potential vendors might access a secure Web site to view a list of current posts. A 508, one or more responses may be received from the potential vendors. For example, one vendor might enter information via a Web site to indicate that an appropriate taillight assembly is available for $10 while another vendor indicates that one is available for $8.

Figure 6:
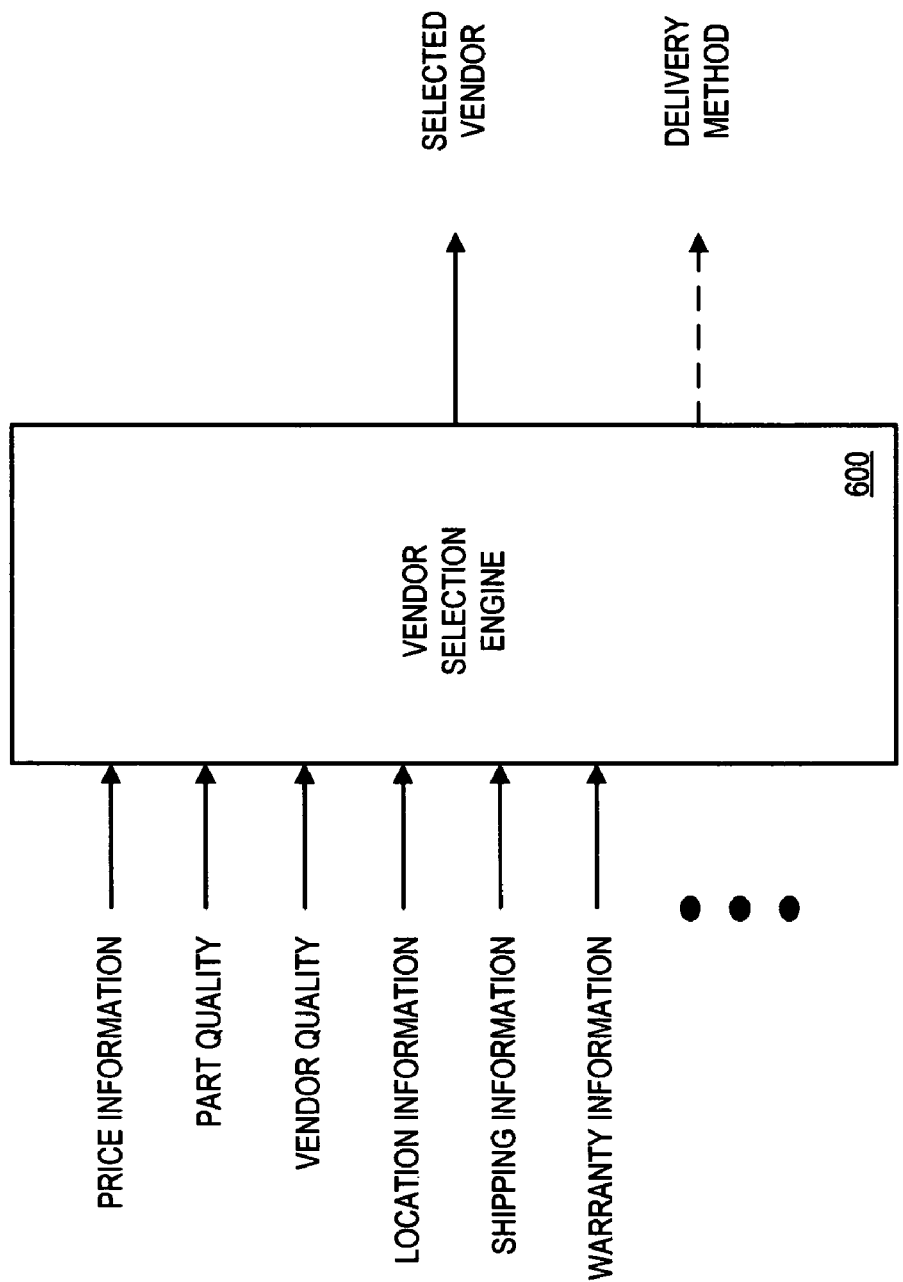
FIG. 6 is a block diagram overview of a vendor selection engine according to some embodiments of the present invention.

The transaction entity may then select the most appropriate potential vendor at 510. According to one embodiment, the selection of the most appropriate potential vendor is performed by a vendor selection engine. For example, FIG. 6 is a block diagram overview of a vendor selection engine 600 according to some embodiments of the present invention. In this case, the vendor selection engine may receive price information, part quality information (e.g., how many miles an engine has driven), vendor quality information (e.g., a vendor grade), shipping information, payment terms, return policies, and/or warranty information. Note that other information could also be used by the vendor selection engine 600. The vendor selection engine 600 may the output a selected vendor. According to some embodiments, the vendor selection 600 may also output an appropriate method of delivery (e.g., air or ground shipping based on a customer location, a selling vendor location, and/or (iii) a product weight).

By way of example, a first vendor might be willing to sell an engine for $2,000 and it might cost $100 to ship the engine from that vendor to the customer. A second vendor might be willing to sell an engine for $1,500 but the cost of sending it to the customer from the second vendor would be $700. In this case, the vendor selection engine 600 might select the first vendor. It might also be the case, however, that the second vendor provides a better warranty for the engine and has performed better than the first vendor in the past (e.g., is more prompt in shipping products). In this case, the vendor selection engine might select the second vendor.

Referring again to FIG. 5, the transaction entity may then arrange for the selected vendor to ship the engine to the customer at 512. For example, the transaction entity may provide payment (or agree to pay) to the selected vendor along with shipping instructions (e.g., the customer name and address). According to some embodiments, a vendor might be paid via an electronic data interchange. Note that if no acceptable responses were received at 508, an extended search for an appropriate vendor may be performed at 514 (e.g., an operator may place telephone calls to various recyclers and/or negotiate a price).

According to some embodiments, the selling vender ships the product in a package associated with the transaction entity. For example, the transaction entity might provide envelopes, boxes, and/or labels that feature the transaction entity's logo (e.g., which also is displayed on the Web page and/or kiosk). In this way, the customer might feel that he or she has dealt with only one party (e.g., the transaction entity) and may, as a result, feel more comfortable and satisfied with the transaction. According to some embodiments, the transaction entity may automatically transmit an instruction to a delivery service indicating that an item will be shipped from the vendor to a destination (e.g., a customer or retail store).

Figure 7:
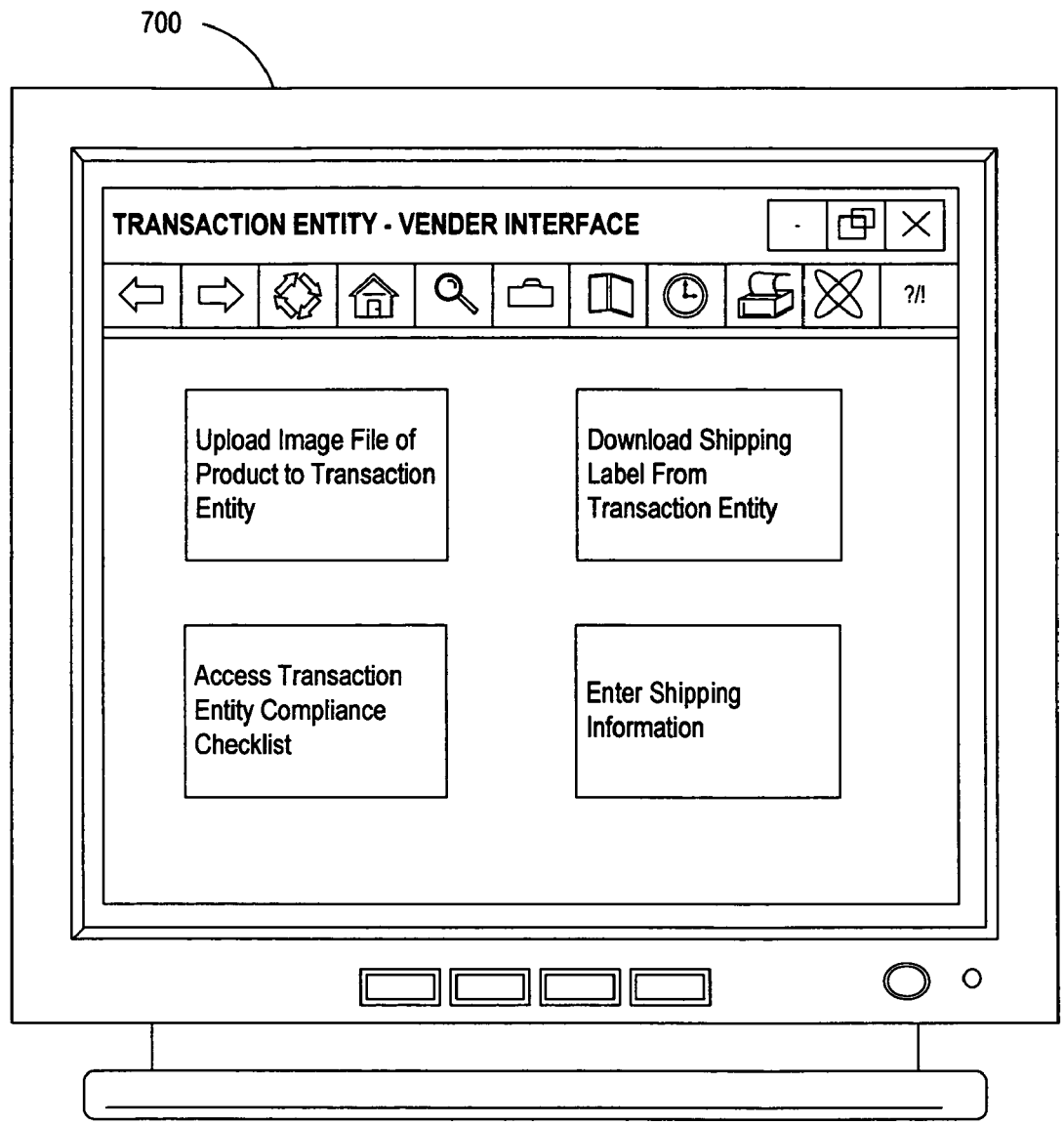
FIG. 7 illustrates another vendor interface according to some embodiments of the present invention.

FIG. 7 illustrates another vendor interface 700 according to some embodiments of the present invention. This interface 700 might be displayed, for example, to a vendor after the vendor has been selected to provide a product to a customer. The vendor might use the display, for example, to upload to the transaction entity product image information (e.g., a bit map file) captured by the selling vendor before the sold product is shipped. Such a feature might, for example, help the transaction entity monitor the vendor's performance and/or settle disputes (e.g., a customer who complains that he or she received a wrong or broken part).

The interface 700 might also be used to download from the transaction entity an electronic representation of a shipping label. For example, an ADOBE ACROBATS file representation of a FED EX® label and/or bill of lading might be transmitted to the vender (e.g., with the customer's name and address), who can then simply print and use the label. According to some embodiments, the transaction entity can store a tracking number associated with a shipment of the sold product to the customer. In this way, the transaction entity might be able to respond to questions from a customer about when he or she might receive the product. According to some embodiments, the transaction entity may automatically (e.g., without intervention by an operator) retrieve a tracking number from a delivery service (e.g., UPS® or FED EX®).

Figure 8:
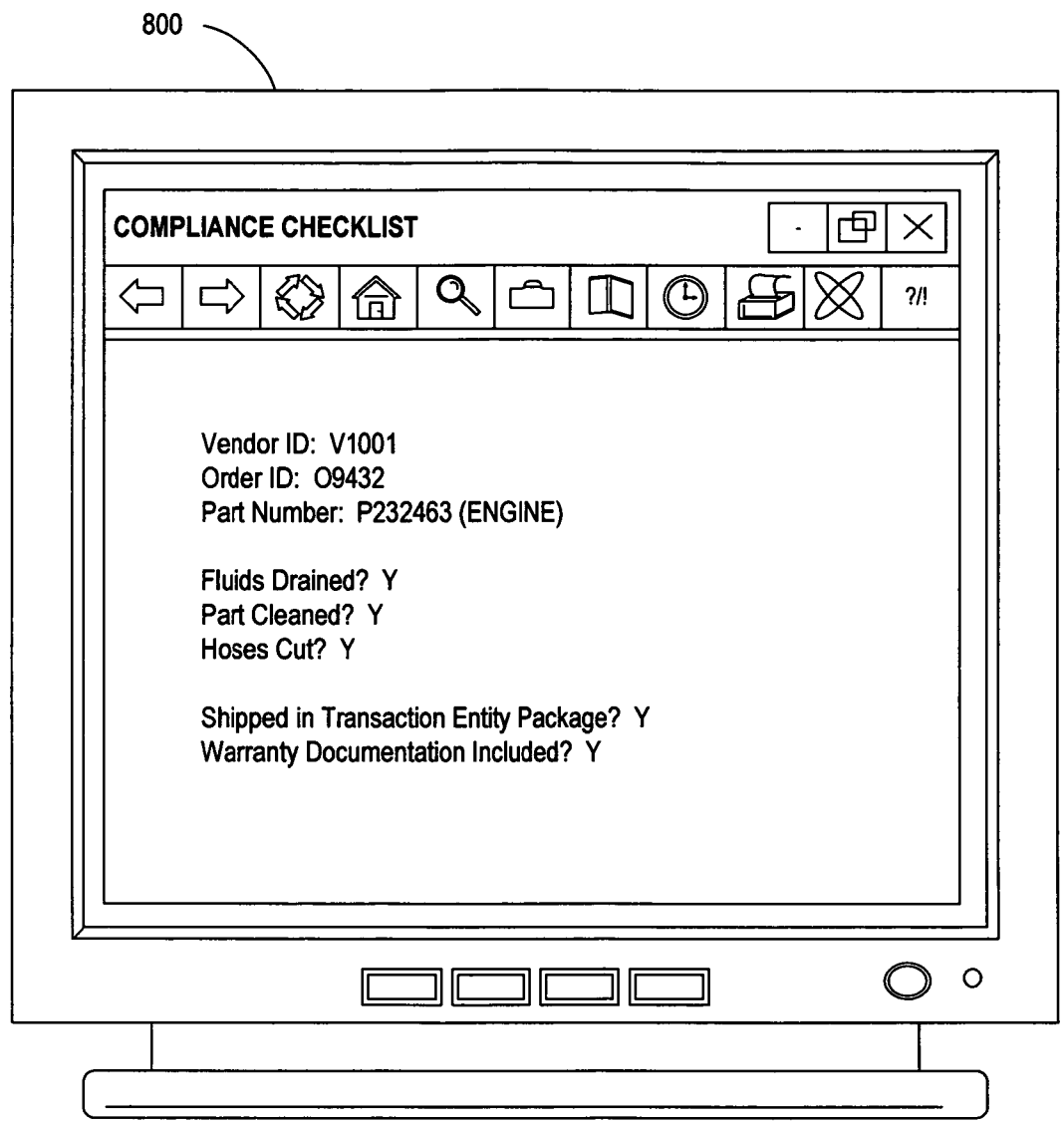
FIG. 8 illustrates a vendor compliance interface according to some embodiments of the present invention.

The interface 700 might also be used to help the vendor comply with one or more transaction entity standards. For example, clicking on the "Access Transaction Entity Compliance Checklist" on the interface 700 might result in a new interface being displayed, such as the one illustrated in FIG. 8. In particular, the new interface 800 might ensure that various procedures have been followed (e.g., fluid drained from engine and hoses cut). According to some embodiments, the distribution center 150 illustrated in FIG. 1 may perform some or all of these functions or checks.

Figure 9:
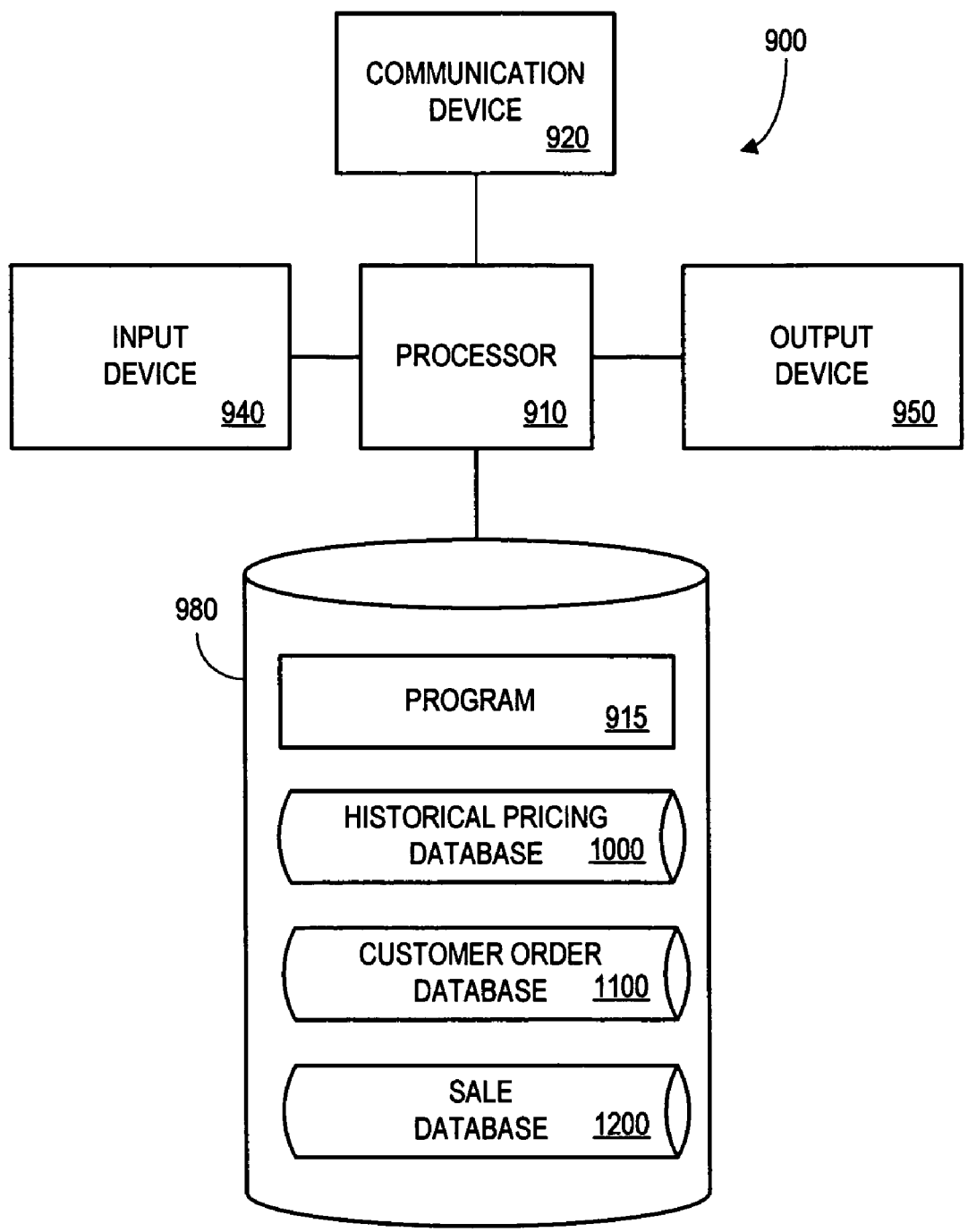
FIG. 9 is a block diagram overview of an apparatus according to some embodiments of the present invention.

FIG. 9 is a block diagram overview of an apparatus 900 that may be associated with a transaction entity according to some embodiments of the present invention. The apparatus 900 comprises a processor 910, such as one or more INTEL® Pentium® processors, coupled to a communication device 920 configured to communicate via a communication network (not shown in FIG. 9). The communication device 920 may be used to communicate, for example, with one or more remote customer and/or vendor devices.

The processor 910 is also in communication with an input device 940. The input device 940 may comprise, for example, a keyboard and/or a mouse that may be used, for example, to enter information (e.g., customer, vendor, product, or transaction information).

The processor 910 is also in communication with an output device 950. The output device 950 may comprise, for example, a display (e.g., a display screen) and/or a printer. The output device 950 may be used, for example, to output reports (e.g., describing customer, vendor, product, or transaction information).

The processor 910 is also in communication with a storage device 980. The storage device 980 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

The storage device 980 stores a program 915 for controlling the processor 910. The processor 910 performs instructions of the program 915, and thereby operates in accordance with the present invention. For example, the processor 910 may determine historical pricing information associated with a plurality of used automotive part vendors and a plurality of used automotive parts and store the information into a historical pricing database 1000. The processor 910 may further receive from a remote customer (e.g., via the communication device 92) purchasing information associated with a requested used automotive part. Based at least on the purchasing information and the historical pricing information, the processor 910 may automatically calculate a first price. After a customer agrees to provide payment of an amount based on the first price in exchange for the used part, the processor 910 may automatically arrange for a remote selling vender to ship a sold used automotive part to the customer in exchange for payment of a second price (e.g., different than the first price) to the vendor.

As shown in FIG. 9, the storage device 980 also stores: the historical pricing database 1000, a customer order database 1100, and a sale database 1200. Examples of databases that may be used in connection with the apparatus 900 will now be described in detail with respect to FIGS. 10 through 12. The illustrations and accompanying descriptions of the databases presented herein are exemplary, and any number of other database arrangements could be employed besides those suggested by the figures.

Figure 10:
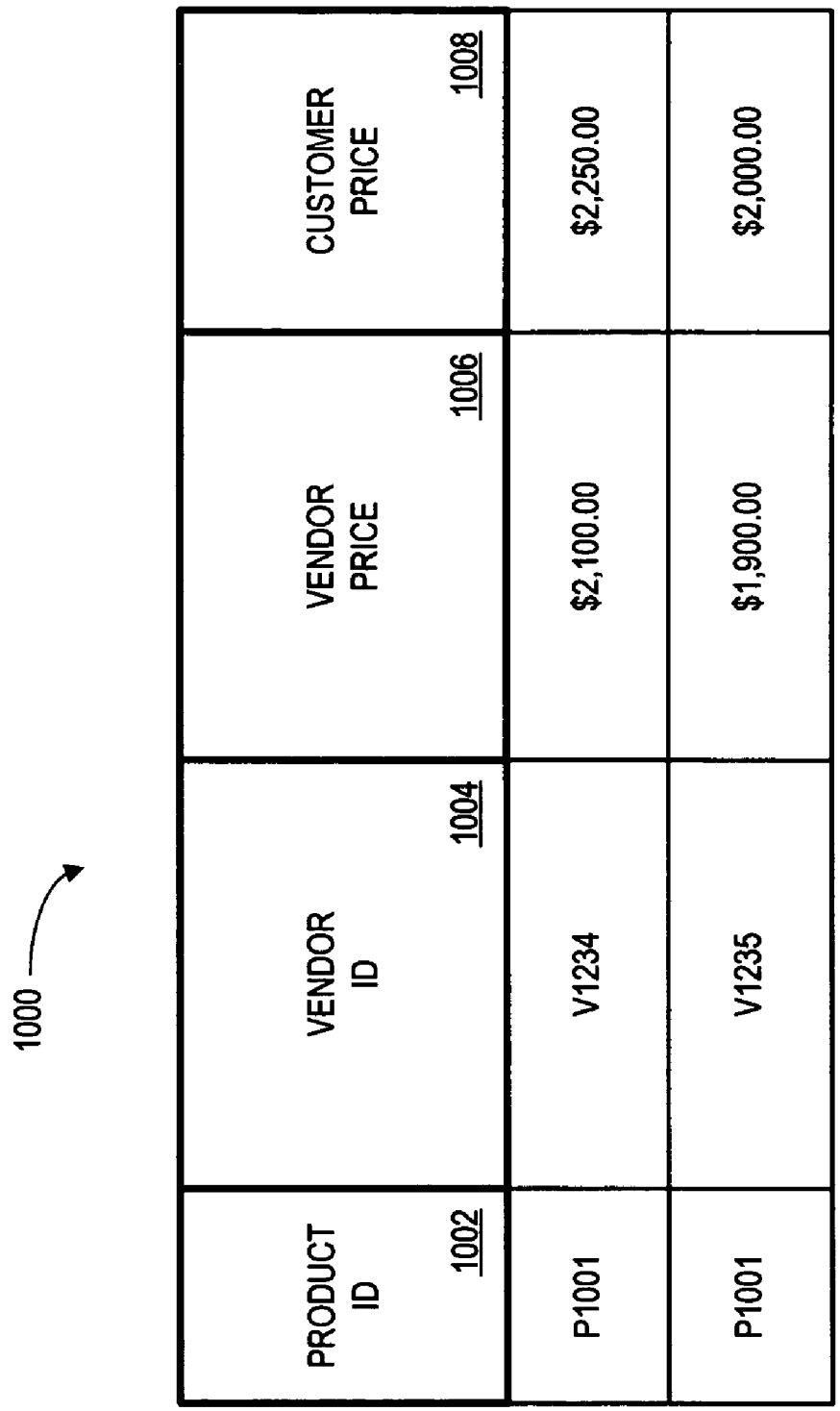
FIG. 10 is a tabular representation of a historical pricing database according to one embodiment of the present invention.

Referring to FIG. 10, a table represents the historical pricing database 1000 that may be stored at the apparatus 900 according to an embodiment of the present invention. The table includes entries identifying prior transaction information. The table also defines fields 1002, 1004, 1006, 1008 for each of the entries. The fields specify: a product identifier 1002; a vendor identifier 1004; a vendor price 1006; and a customer price 1008. The information in the historical pricing database 1000 may be created and updated, for example, based on previous transactions that have been facilitated by the transaction entity.

The product identifier 1002 may be an alphanumeric code associated with a particular product that may be purchased via the transaction entity. The vendor identifier 1004 may be an alphanumeric code associated with a particular vendor. The vendor price 1006 may represent an amount for which that vendor had previously sold that product. Similarly, the customer price 1008 may represent an amount for which that vendor had previously purchased that product. The transaction entity may use the information in the historical pricing database 1000, for example, to determine a price that it will charge a customer for a product (even though the transaction entity might not posses the product, or even know which vendor will supply the product, at the time).

Figure 11:
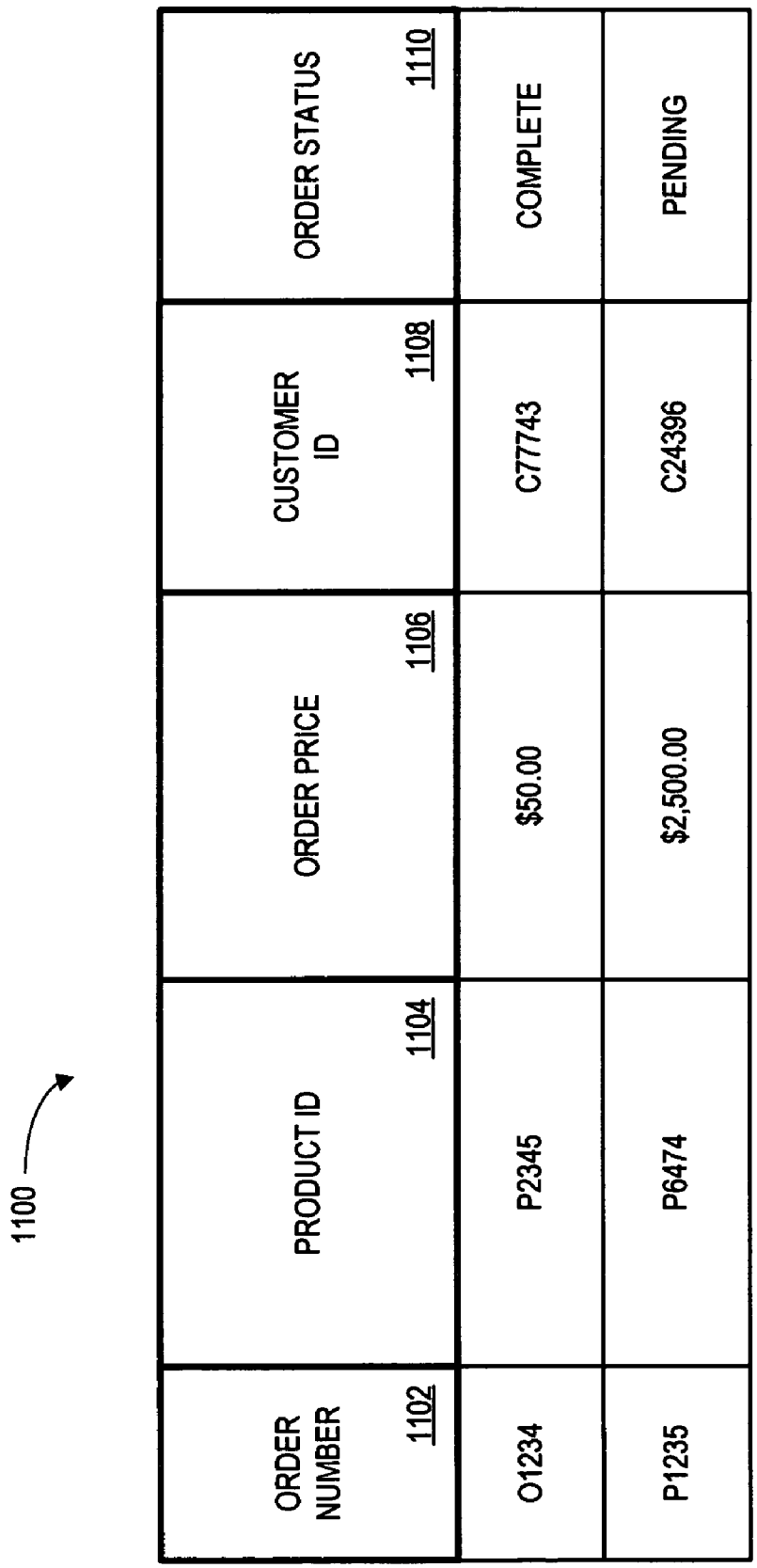
FIG. 11 is a tabular representation of a customer order database according to one embodiment of the present invention.

Referring to FIG. 11, a table represents the customer order database 1100 that may be stored at the apparatus 900 according to an embodiment of the present invention. The table includes entries identifying orders that customers have placed for products. The table also defines fields 1102, 1104, 1106, 1108, 1110 for each of the entries. The fields specify: an order number 1102; a product identifier 1104; an order price 1106; a customer identifier 1108; and an order status 1110. The information in the customer order database 1100 may be created and updated, for example, based on information received from customers and/or vendors.

The order number 1102 may be an alphanumeric code associated with a particular order received from a customer (e.g., via a kiosk or Web site). The product identifier 1104 may be an alphanumeric code associated with a particular product and may be associated with the product identifier 1002 stored in the historical pricing database 1000. The order price 1106 may reflect the price at which the product will be sold to the customer, and the customer identifier 1108 may identify the customer. According to some embodiments, the customer identifier 1108 may include the name, address, and/or credit card information associated with the customer. The order status 1110 may indicate, for example, whether a particular order is "complete" (e.g., the customer has received the product) or "pending" (e.g., a vendor is being selected or the product is en route to the customer).

Figure 12:
FIG. 12 is a tabular representation of a sale database according to one embodiment of the present invention.

Referring to FIG. 12, a table represents the sale database 1200 that may be stored at the apparatus 900 according to an embodiment of the present invention. The table includes entries identifying sales that have been made by vendors. The table also defines fields 1202, 1204, 1206, 1208, 1210, 1212 for each of the entries. The fields specify: a sale identifier 1202; an order identifier 1204; a selected vendor and total cost 1206; a delivery method 1208; image information 1210; and delivery tracking information 1212. The information in the sale database 1200 may be created and updated, for example, based on information received from vendor devices and/or a vendor selection engine.

The sale identifier 1202 may be an alphanumeric code associated with a particular sale made by a vendor. The order identifier 1204 may be an alphanumeric code associated with a particular order placed by a customer and may be associated with the order number 1102 stored in the customer order database 1100. The selected vendor and total cost 1206 might include, for example, a vendor identifier (e.g., associated with the vendor identifier 1004 stored in the historical pricing database 1000) along with a price in exchange for which the vendor will provide the product associated with the order. The delivery method 1208 may indicate how the product will be (or has been) shipped to the customer or retailer. The image information 1210 may comprise, for example, a file representing the product that was actually shipped to the customer. The delivery tracking information 1212 may represent, for example, United States Postal Service tracking number that can be used to help determine the present location of the product.

In this way, a transaction entity may automatically facilitate a transaction between remote customers and/or vendors. Moreover, the customer may perceive that he or she is dealing only with the transaction entity (e.g., the role of the vendor may be minimized from the customer's point of view). In addition, vendors can quickly and easily determine which products are needed, and the transaction entity may help ensure that vendors receive appropriate prices for products.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A method associated with a transaction entity, comprising:
    determining, by a transaction processing system, an average historical sales price for an automotive product;
    receiving, by the transaction processing system, directly from a customer via a kiosk, a product identifier;
    calculating, by the transaction processing system, a first price for the automotive product based at least in part on the average historical sales price and the product identifier;
    agreeing, by the transaction processing system, to provide a customer the automotive product in exchange for payment of the first price;

subsequent to said agreeing:
  selecting a plurality of potential vendors based at least in part on historical performance information and historical pricing information;
  transmitting a request for the automotive product to the plurality of potential vendors;
  receiving, from a selected vendor from the plurality of potential vendors, a second price for the automotive product and an image of the automotive product captured by the selected vendor, wherein the second price is different from and not based on the first price;
  initiating payment of the second price to the selected vendor;
  initiating shipment of the automotive product to a distribution center of the transaction entity;
  monitoring the performance of the vendor using the image of the automotive product.

2. The method of claim 1, wherein the selection of a plurality of potential vendors is further based at least in part on a vendor grade.

3. The method of claim 2, wherein the vendor grade is associated with all of: (i) historical pricing information, (ii) historical performance information, and (iii) warranty information.

4. The method of claim 1, wherein the distribution center is not associated with entities other than the transaction entity.

5. The method of claim 1, wherein the selected vender ships the automotive product in a package associated with the transaction entity.

6. The method of claim 5, further comprising: automatically transmitting to the selected vendor an electronic representation of at least one of: (i) a shipping label, (ii) a bill of lading, or (iii) a packing slip.

7. The method of claim 6, further comprising: selecting a method of shipping based on: (i) a location associated with the customer, (ii) a location associated with the selected vendor, and (iii) a product weight of the automotive product.

8. The method of claim 7, further comprising: storing a tracking number associated with the initiated a shipment of the automotive product to the customer.

9. The method of claim 7, wherein the first price is further based on a cost associated with the selected method of shipping.

10. A non-transitory computer readable medium storing instructions which when executed by a computer processor cause the computer processor to perform a method to facilitate a used automotive part transaction, said method comprising:
  determining, by a transaction processing system, an average historical sales price for an automotive product;
  receiving, by the transaction processing system, directly from a customer via a kiosk, a product identifier;
  calculating, by the transaction processing system, a first price for the automotive product based at least in part on the average historical sales price and the product identifier;
  agreeing, by the transaction processing system, to provide a customer the automotive product in exchange for payment of the first price;
  subsequent to said agreeing:
    selecting a plurality of potential vendors based at least in part on historical performance information and historical pricing information;
    transmitting a request for the automotive product to the plurality of potential vendors;
    receiving, from a selected vendor from the plurality of potential vendors, a second price for the automotive product and an image of the automotive product captured by the selected vendor, wherein the second price is different from and not based on the first price;
    initiating payment of the second price to the selected vendor;
    initiating shipment of the automotive product to a distribution center of the transaction entity;
    monitoring the performance of the vendor using the image of the automotive product.

11. The medium of claim 10, wherein the method further comprises: automatically transmitting to the selected vendor an electronic representation of at least one of: (i) a shipping label, (ii) a bill of lading, or (iii) a packing slip.

12. The medium of claim 10, wherein the method further comprises: storing a tracking number associated with the initiated shipment of the automotive part to the customer.

13. An apparatus, comprising:
  a communication unit;
  a processor; and
  a storage device in communication with said processor and storing instructions which, when executed by said processor, cause said processor to perform the following steps:
  determine, by a transaction processing system, an average historical sales price for an automotive product;
  receive, by the transaction processing system, directly from a customer via a kiosk, a product identifier;
  calculate, by the transaction processing system, a first price for the automotive product based at least in part on the average historical sales price and the product identifier;
  agree, by the transaction processing system, to provide a customer the automotive product in exchange for payment of the first price;
  subsequent to said agreeing:
    select a plurality of potential vendors based at least in part on historical performance information and historical pricing information;
    transmit a request for the automotive product to the plurality of potential vendors;
    receive, from a selected vendor from the plurality of potential vendors, a second price for the automotive product and an image of the automotive product captured by the selected vendor, wherein the second price is different from and not based on the first price;
    initiate payment of the second price to the selected vendor;
    initiate shipment of the automotive product to a distribution center of the transaction entity;
    monitor the performance of the vendor using the image of the automotive product.

14. The apparatus of claim 13, wherein the storage device further stores at least one of: (i) a historical pricing database, (ii) a customer database, or (iii) a sale database.

15. The apparatus of claim 13, wherein the storage device further stores instructions adapted to be executed by said processor to:
  automatically transmit an electronic representation of a shipping label to the selected vendor, and
  store a tracking number associated with the initiated shipment of the automotive product to the customer.

* * * * *